Sept. 14, 1943.          T. KAYSEN, JR          2,329,350
             WATER SOFTENING SYSTEM AND APPARATUS
                  Filed April 4, 1941            2 Sheets-Sheet 1
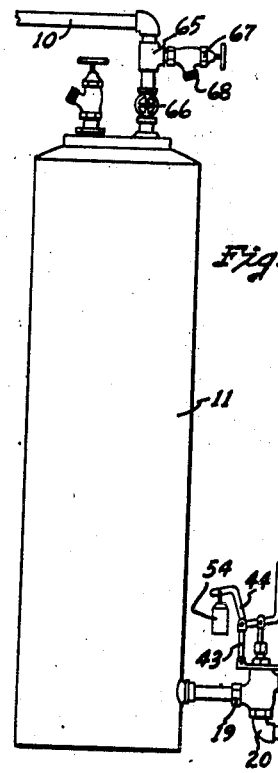
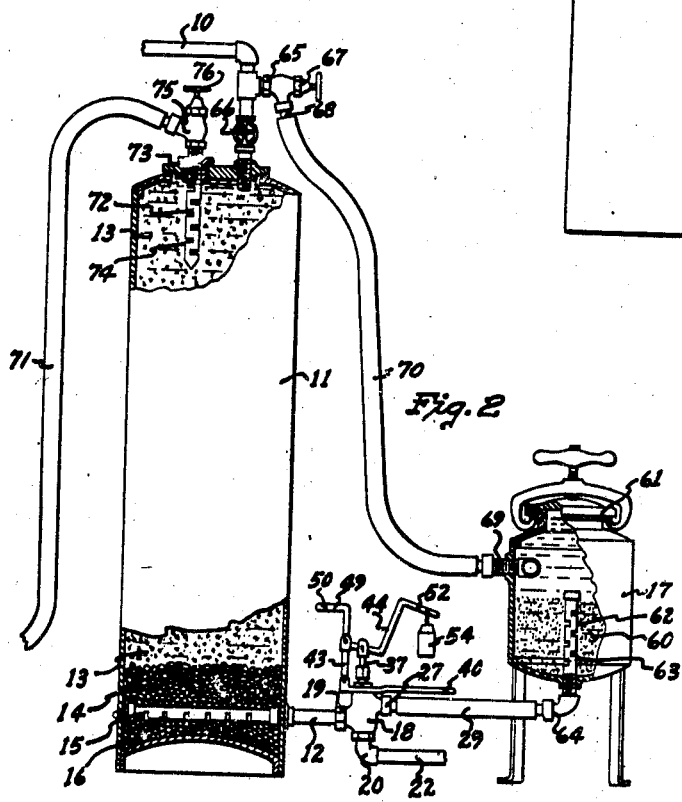
INVENTOR
*THEODORE KAYSEN Jr.*
BY
*G. H. Braddock*
ATTORNEY Sept. 14, 1943.     T. KAYSEN, JR     2,329,350
WATER SOFTENING SYSTEM AND APPARATUS
Filed April 4, 1941     2 Sheets-Sheet 2

INVENTOR
*THEODORE KAYSEN Jr.*
BY
*G. H. Braddock*
ATTORNEY

Patented Sept. 14, 1943

2,329,350

UNITED STATES PATENT OFFICE 2,329,350

WATER SOFTENING SYSTEM AND APPARATUS

Theodore Kaysen, Jr., St. Paul, Minn., assignor to The McKays Company, St. Paul, Minn., a corporation of Delaware Application April 4, 1941, Serial No. 386,802

15 Claims. (Cl. 210—24)

This invention relates to a water softening system and apparatus, and has more particular relation to a so-called "rental" water softener.

A zeolite water softener is a unit consisting of some kind of a container having a bed of zeolite and incorporated in a water line in such manner that water flowing through the line must flow through the bed of zeolite, to thus become softened, zeolite being a medium for absorbing calcium and magnesium from water when this establishes contact with the zeolite particles, and for giving up into the water in place of the calcium and magnesium absorbed, sodium contained in the zeolite. After the calcium and magnesium have been taken out, the water passes from the softener to the water line, ready for use. In the operation of a zeolite water softener, when the zeolite bed has absorbed the limit of its capacity for taking on calcium and magnesium and released sodium in place thereof, hard water passing through the bed of zeolite will no longer be softened. Just before the zeolite reaches such a saturated stage, the softener is given what is termed a regeneration. Regenerating a zeolite water softener involves the flushing of the zeolite bed with a salt brine solution. In the regeneration process the zeolite reverses its action as before described, absorbing sodium from the brine solution and giving up the calcium and magnesium which had been previously absorbed during the softening process. In practice, the softening process and the regenerating process are repeated over and over again. With good water conditions there is, perhaps, no limit to the length of time service can be obtained from a bed of zeolite.

Brine solutions used in regenerating processes have heretofore been fed to zeolite beds in water softeners in several different ways. In one type of water softener, means are provided in the top head of the zeolite container, or softening tank, adapted to permit solid salt to be dumped through this top head into the tank, where the salt dissolves in a bed of water covering the zeolite bed in the upper portion of the tank. The top head of the tank is closed, and water is turned into the tank flowing downward dissolving the salt and washing the brine solution through the zeolite material to regenerate it. Another system of regeneration of zeolite of a water softener contemplates the closing of a valve over a permanently installed salt pot of the softener to cut off the water supply leading to the softener, then opening a drain valve at the base of the softener, taking the cover off of the salt pot, pouring the required amount of salt for the regeneration into the salt pot, and then closing the lower drain valve and opening the valve over the salt pot, permitting the water pressure to fill the salt pot and start the process of dissolving the salt therein. A valve at the top of the softener container is then opened, as is also the drain valve, permitting the water to flow through the softener to the drain and carry the brine solution which is being formed in the salt pot to the drain. Another system of getting brine solution to a zeolite bed at regeneration period is accomplished by feeding to the zeolite bed a brine solution which is already prepared and which is drawn into the softener by some suitable means. In the operation of the last mentioned system, the brine solution is prepared in a separate vessel by dumping salt into said vessel with water to dissolve the salt. Then when regeneration is to be accomplished, this brine solution is drawn into the zeolite container to flush the zeolite by some suitable means. Another system of regenerating mineral beds of zeolite contemplates storing a large quantity of salt in a vessel and from time to time feeding a quantity of water to a lower part of the vessel thus to convert a portion only of the stored salt into brine solution and causing the brine solution to be applied to the zeolite in some manner. Another system of regeneration contemplates removal of the zeolite container, with spent zeolite, from the water line, and replacement of the removed container by a container having regenerated zeolite therein. The last mentioned system may be termed a "rental" water softener or system. The spent zeolite in removed containers is treated with brine solution, thus to be revivified, at location remote from the water softener from which taken. The containers with fresh zeolite are "rented," and when the zeolite in a container becomes spent, the container is removed from the water softening system and transported to a means, usually factory installed, for regenerating the zeolite. At the time a container with spent zeolite is removed from a water softener, a container with regenerated zeolite is installed. Still another system of regenerating, which may also be termed a "rental" water softener or system, might be considered as a modification of the just before mentioned "rental" water softener or system. This modified system contemplates removal of spent zeolite, ordinarily in package form, from the containers and replacement of the spent by regenerated zeolite.

In practice, known systems for the repeated regeneration of zeolite beds of water softeners include problems and require that the water softeners be more or less expensive. By way of example, systems employing already prepared brine solution require specially constructed brine containers, because brine solution is quite corrosive. Space occupied by separate brine containers, or by separate large-quantity salt containers, is generally a major factor, particularly in the instance of domestic types of water softeners. Permanently installed salt containers for water softeners include their expense. Specially constructed zeolite containers required for certain types of water softeners include more or less complication with attendant expense. The removal and replacement of containers having zeolite, or the removal and replacement of the zeolite itself, is more or less cumbersome and not economical. And, too, a zeolite container, or zeolite, removed from a water softener necessarily contains or includes some water of the system. In an instance where the water may be contaminated, there could be a spreading of the contamination to other and remote water softening systems. That is, there is, evidently, risk of spreading of contamination by removal of mineral beds of zeolite from water softeners and placing the mineral beds in different water softeners.

An object of the present invention is to provide a water softening system and apparatus of the so-called "rental" water softener type which will be of simple, economical, novel and improved construction.

A further object is to provide a water softening system and apparatus wherein will be incorporated various improved features and characteristics of construction novel both as individual entities of the system and apparatus and in combination with each other.

A further object is to provide a novel and improved water softening system and apparatus designed with the end in view of the accomplishment of the regeneration of mineral beds of zeolite of water softeners in novel, improved, simple and economical manner.

And a further object is to provide a so-called "rental" water softener which will be constituted as hereinafter set forth.

With the above objects in view, as well as others which will appear as the specification proceeds, the invention comprises the construction, arrangement and combination of parts as now to be fully described and as hereinafter specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is an elevational view of a water softener including the features and characteristics of the invention, as when in water softening operation;

Fig. 2 is an elevational view, partially in section and partially broken away, of the water softener of Fig. 1, as when the mineral bed of zeolite of said water softener is connected up for regeneration;

Figure 3:
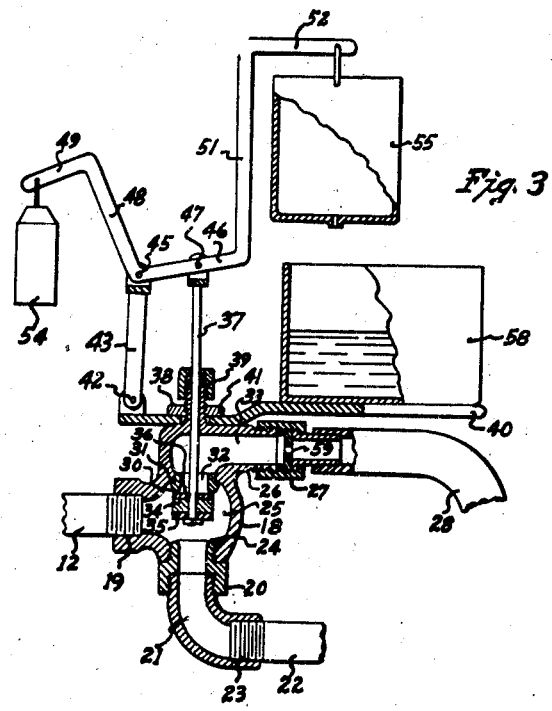
Fig. 3 is a view detailing entities or elements of the water softener positioned as in Fig. 1.

With respect to the drawings and the numerals of reference thereon, an inlet connection 10 leads from a source (not shown) of water supply to a water softening medium container 11, and an outlet connection 12 from said water softening medium container is adapted to lead to locations of use, such as faucets (not shown), for water. The water to be softened enters at the top of the container 11 and passes downwardly through a softening medium 13, usually zeolite, in the container, which absorbs such constituents as calcium and magnesium from and releases sodium to the water. When the softening medium or zeolite reaches its saturated state, it is regenerated, usually by flushing with a salt brine solution.

A gravel supporting bed 14 for the softening medium or zeolite 13 is situated in the base of the container 11, and a usual distributor 15 in said gravel supporting bed is in communication with the outlet connection 12. The distributor 15 includes ports 16. The supporting bed 14 may be gravel, screens, cork, charcoal, or other suitable filtering means.

A salt tank 17, useful to the accomplishment of regeneration of the softening medium or zeolite 13, is not a part of the water softener when in water softening operation, as will be clear from Fig. 1, but is associated or assembled with the water softening medium container 11, as disclosed in Fig. 2, when the mineral bed of zeolite of said water softener is to be regenerated.

A valve casing 18 is secured, as at 19, to the outlet connection 12, and a fitting 20 in a lower part of the valve casing 18 includes a passageway 21 leading to a pipe connection 22 for conveying water to faucets or other places of consumption. The fitting 20 and the pipe connection 22 are secured together, as at 23.

A valve seat 24 of the fitting 20 is disposed in the lower portion of a chamber 25 of said valve casing 18 in surrounding relation to the passageway 21, and the outlet connection 12 opens to said chamber 25 at the side of said valve seat 24 opposite said passageway 21.

Figure 4:
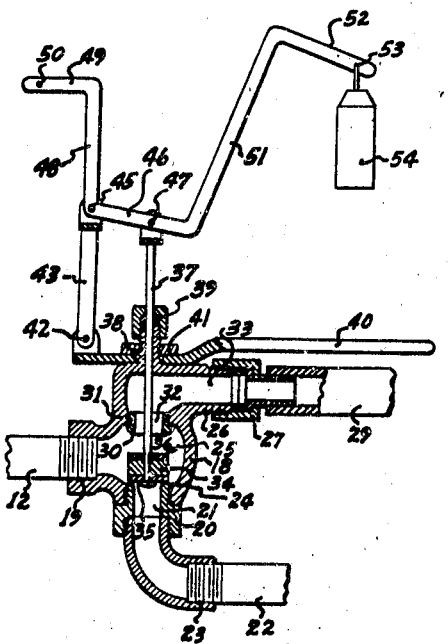
Fig. 4 is a view detailing entities or elements of said water softener positioned as in Fig. 2.
Figure 5:
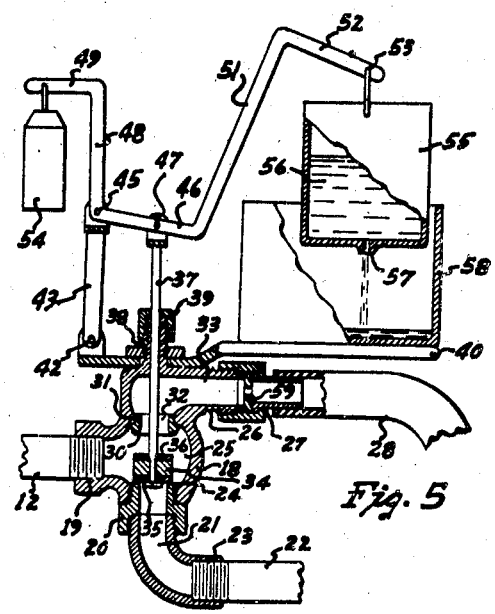
Fig. 5 is a view detailing the entities or elements disclosed in Fig. 1, but showing said entities or elements at positions in which they are situated when brine solution is being washed or removed from the mineral bed of zeolite.

A hollow tubular element 26 of the valve casing 18, integral with said valve casing and disposed above the chamber 25 in the disclosed embodiment of the invention, is for selective connection, as at 27, with either a drain pipe 28 for the water softener, as in Figs. 1, 3 and 5, or with a brine solution connecting pipe 29 for affording communication between the salt tank 17 and said hollow tubular element 26, as in Figs. 2 and 4.

A valve seat 30 of a reducing fitting 31, situated between the chamber 25 and the hollow tubular element 26, is disposed in the upper portion of said chamber 25 in surrounding relation to a passageway 32 of said reducing fitting 31 for affording communication between said chamber 25 and the interior 33 of said hollow tubular element 26. The valve seat 30 is in vertical alinement with and parallel relation to the valve seat 24 and is disposed at the side of the outlet connection 12 which is opposite said valve seat 24.

A double valve 34 situated within the chamber 25 is adapted to be reciprocated between the valve seats 24 and 30. A lower closure surface 35 of the double valve 34 is adapted to be seated against the valve seat 24 to shut off communication between the outlet connection 12 and the pipe connection 22, and an upper closure surface 36 of said double valve is adapted to be seated against the valve seat 30 to shut off communication between said outlet connection 12 and the hollow tubular element 26. The construction and arrangement are such that when the lower closure surface 35 is against the valve seat 24, the upper closure surface 36 is in spaced relation to the valve seat 30, and when said upper closure surface 36 is against said valve seat 30, said lower closure surface 35 is in spaced relation to said valve seat 24.

A valve stem 37, rigid with the double valve 34, extends through the interior 33 of the tubular element 26, as well as through the passageway 32 of the reducing fitting 31, and is slidably mounted, as at 38, in an upper portion of the valve casing 18. A packing gland 39 about the valve stem 37 is for an obvious purpose.

A bracket 40, suitably and conveniently supported, as at 41, upon the valve casing 18, carries, desirably pivotally, as at 42, an upstanding fulcrum or link 43. Said fulcrum or link is disposed at a side of the valve stem 37, in slightly spaced relation to said valve stem as disclosed.

A compound lever 44 has an intermediate portion thereof pivoted, as at 45, upon an upper portion of the fulcrum or link 43, and an intermediate length 46 thereof, at the side of said fulcrum or link adjacent the valve stem 37, pivotally connected, as at 47, to an upper portion of said valve stem. The intermediate length 46 of the compound lever 44 is substantially horizontal in the disclosed embodiment of the invention. A leg 48 of the compound lever 44 extends upwardly from the pivotal support 45, and said pivotal support is at the location of jointure between the intermediate length 46 and said leg 48. An extension 49 upon the upper end of the leg 48 is, as shown, in perpendicular relation to said leg and situated at the side of the leg opposite the intermediate length 46. Said extension 49 is adapted to removably support a counterweight, and to this purpose is provided with an opening 50 disposed in spaced relation to the leg 48. A leg 51 of the compound lever 44 extends upwardly from the end of the intermediate length 46 spaced from the pivotal support 45, and an extension 52 upon the upper end of said leg 51 is, as shown, in perpendicular relation to the leg and situated at the side of said leg opposite said intermediate length 46. Said extension 52 is also adapted to removably support a counterweight, and to this purpose is provided with an opening 53 disposed in spaced relation to the leg 51.

A counterweight 54, adapted to be removably supported upon either the extension 49 or the extension 52, may be of ordinary or preferred construction.

A counterweight 55, adapted to be removably supported upon the extension 52, is constituted as a pail or bucket with water 56 and having a leak opening 57 in its lower portion. A vessel 58 for receiving water which leaks from the pail or bucket is as shown adapted to be removably supported upon the bracket 40 at location below and in spaced relation to the extension 52.

As is very clearly disclosed in Figs. 3 and 5, when the drain pipe 28 is secured to the hollow tubular element 26, the connection 27 will include a restriction member 59, for a purpose to be made plain, and, as will be apparent from Fig. 4, when the brine solution connecting pipe 29 is secured to said hollow tubular element, said connection 27 will desirably be unrestricted.

The salt tank 17 is adapted to receive solid salt 60, and a removable cover 61 for said salt tank is to the purpose that salt can be placed in the tank. The cover 61 when fastened down is water-tight. A screen 62 fixed in the lower portion of the salt tank includes ports 63, and the lower end of said screen 62, outside of the salt tank, is provided to be detachably secured, as at 64, to the end of the brine solution connecting pipe 29 spaced from the hollow tubular element 26.

The inlet connection 10 includes a fitting or fittings 65 at the intake side of the container 11. A manually actuable valve 66 in the fitting or fittings 65 is for controlling flow of water from said inlet connection 10 by way of said fitting or fittings to said container 11, and a manually actuable valve 67 also in the fitting or fittings 65 is for controlling flow of water from the inlet connection by way of said fitting or fittings to a water outlet 68 of the fitting or fittings. Said water outlet 68 is for conveyance of water from the inlet connection 10 to the salt tank 17.

A connecting element 69 for flow of water into the salt tank 17 is situated in a wall of said salt tank, as disclosed at elevation above the level of the salt 60, and a connecting pipe 70 for water, for affording communication between the water outlet 68 of the fitting or fittings 65 and the salt tank, is adapted to be detachably inserted between said water outlet 68 and said connecting element 69, as disclosed in Fig. 2.

An auxiliary drain pipe 71 is adapted to lead from the upper portion of the water softening medium container 11. A screen 72 fixed, as at 73, in the upper end of said container 11 includes ports 74. A fitting 75 is secured to said screen 72 and is situated above said container, and the auxiliary drain pipe 71 is adapted to be detachably secured to said fitting. A manually actuable valve 76 in the fitting 75 is for controlling flow of liquid, water and brine solution, from the container out of the auxiliary drain pipe 71.

When the water softener is operating between its periods of regeneration, the double valve 34 is positioned as disclosed in Figs. 1 and 3. That is, the upper closure surface 36 is engaged against the valve seat 30 to shut off communication between the outlet connection 12 and the drain pipe 28, and said outlet connection 12 is in free communication with the pipe connection 22 by way of the chamber 25 and the passageway 21. Said double valve 34 is retained positioned as in said Figs. 1 and 3 by the counterweight 54 while supported upon the extension 49. When the water softener is in water softening operation, the valve 66 is open and the valves 67 and 76 are closed. The flow of water from the inlet connection 10 is downwardly through the zeolite bed and through the outlet connection 12 to the pipe connection 22 by way of said chamber 25 and said passageway 21 when the water softener is in softening operation.

When the softening medium or zeolite 13 is to be regenerated, said valve 66 is closed, the valves 30—36, 67 and 76 being closed, and the salt tank 17, with solid salt therein, is connected up, by means of the pipes 29 and 70, with the hollow tubular element 26 of the valve casing 18 and the outlet 68 of the fitting or fittings 65 in the manner as illustrated in Fig. 2 and as hereinbefore set forth. The counterweight 54 is removed from the extension 49 and the counterweight or pail or bucket 55 is removed from the extension 52, and said counterweight 54 is supported upon said extension 52, after the valve 66 is closed and either before or after the salt tank is associated or assembled with the zeolite container. The counterweight 54 when supported upon the extension 52 is adapted to cause the compound lever 44 to be actuated to position as in Fig. 4, so that the lower closure surface 35 is engaged against the valve seat 24 to shut off communication between the outlet connection 12 and the pipe connection 22, and the brine solution connecting pipe 29 is in free communication with said outlet connection, soon to become an inlet connection, by way of the hollow tubular element 26, the passageway 32 and the chamber 25. After the valves 66 and 24—35 are closed and the valve 30—36 is opened, the valves 67 and 76 are opened, thus to cause water from the inlet connection 10 to flow into the salt tank 17 by way of the fitting or fittings 65, the pipe 70 and the connecting element 69, and brine solution to be forced out of the salt tank into the container 11 by way of the screen 62, the pipe 29 and the valve casing 18. The brine solution will be forced into the container 11 under head pressure of water in the inlet connection 10, and water and brine solution will flow out of the auxiliary drain pipe 71 with the forcing of water and brine solution from the salt tank into said container 11. The brine solution thus made to flow into the zeolite container will cause the zeolite to be flushed and thus regenerated, and the valves 67 and 76 will be closed after flushing and backwashing of the zeolite is completed. Attention is specifically called to the fact that the salt brine is fed to the mineral bed of zeolite in direction opposite that in which the water flows during the softening operation. Thus, with feeding of the regenerating solution to the zeolite, the mineral bed is backwashed and loosened.

The pipes 29 and 70 will be removed from the tubular element 26 and the water outlet 68, respectively, while all of the valves 24—35, 66, 67 and 76 are closed, and, with removal of said pipes 29 and 70, the drain pipe 28, with restriction member 59, will be connected to said tubular element 26.

Flushing and backwashing of the zeolite can be continued as long as may be desirable, and, after flushing and backwashing, it is necessary to wash the brine solution, and traces thereof, from the mineral bed. To accomplish this, and assuming the salt tank and its connecting pipes 29 and 70 to have been disassociated or disassembled from the container 11, and the drain pipe 28 to have been associated or assembled with the tubular element 26 of the valve casing 18, the valve 66 is opened, while the valve 24—35 is held closed and the valve 30—36 is held open, the valves 67 and 76 being closed, thus to cause or permit water from the inlet connection 10 to flow downwardly through the zeolite bed and out of the drain pipe 28 by way of the outlet connection 12, the chamber 25, the passageway 32, the tubular connection 26 and the restriction member 59. It is necessary that washing of the zeolite be continued for some appreciable time to insure that all traces of salt brine are removed, and, desirably, the flow of water through the zeolite bed to the accomplishment of the washing operation should be relatively slow thus to be thoroughly distributed throughout the zeolite bed. It is to the purpose of accomplishing proper washing of the zeolite bed that the restriction member 59 is provided in the line of flow of water from the container 11 to the drain pipe 28.

Provision constituted by mechanism before described is included for retaining the valve 30—36 open and the valve 24—35 closed while the valve 66 is open for a predetermined sufficient interval of time which will cause washing of the zeolite to be complete and for automatically opening said valve 24—35 and closing said valve 30—36 upon the expiration of said predetermined sufficient interval of time. Plainly, opening the valve 24—35 and closing the valve 30—36, after washing of the zeolite is accomplished, connects the inlet connection and the zeolite container with the pipe connection 22, so that the water softener is set or ready to commence softening operation, and shuts off the drain pipe 28. More explicitly, the counterweight 55 with its included water 56 has weight greater than the counterweight 54, but the pail or bucket of said counterweight 55, without water, is lighter than said counterweight 54. When brine solution is to be washed from the zeolite bed, the counterweight 55 loaded with an amount of water is supported upon the extension 52 and the counterweight 54 is supported upon the extension 49, as said counterweights are disclosed in Fig. 5. The counterweight 55 when loaded with water is adapted to overbalance the counterweight 54 to cause said valve 24—35 to be closed and said valve 30—36 to be open, as in said Fig. 5. The construction and arrangement are such that the counterweight 55 in time will become lighter than the counterweight 54, by passage of water from the leak opening 57, to extent sufficient to cause or permit said counterweight 54 to overbalance said counterweight 55 thus to actuate the double valve 34 to cause the valve 24—35 to become opened and the valve 30—36 to become closed. The amount of water placed in the pail or bucket of the counterweight 55 will be a predetermined amount calculated to cause the valve 24—35 to remain closed and the valve 30—36 to remain open for precisely the interval during which it is intended that washing of the zeolite bed be continued.

The purpose of the inclusion of the construction and arrangement for accomplishing washing of the zeolite bed for a predetermined sufficient interval of time and for causing the water softener to become automatically set or ready to be capable of commencing softening operation after washing is completed is to relieve the workman of necessity of waiting around until washing of the zeolite bed has been accomplished. Obviously, a workman need spend only a very few minutes to the accomplishment of the flushing operation of the softening medium or zeolite 13. The tank 17 for salt is readily and easily and quickly attachable to and detachable from the water softening medium or container 11, and, evidently, the construction and arrangement provide for really quick and thorough flushing of the zeolite with salt brine after the container 11 and the salt tank 17 are assembled together. The relatively short period of time required to assemble and disassemble the container and salt tank, to accomplish flushing and backwashing, and to support the counterweights as in Fig. 5 is all the time a workman need spend in order that regeneration and washing of the zeolite can be complete. During the much longer interval of time required for washing, the workman can be otherwise occupied.

In practice, the salt tank and its connections will be removed from the softening medium container, as in Fig. 1, while the water softener is in softening operation. Desirably, a workman will carry a salt tank, such as 17, to a water softener to be regenerated, and after flushing and mounting the counterweights as in Fig. 5, will take the salt tank from the location of the regenerated water softener for use in the operation of regenerating a different water softener. Only a single salt tank, or a few salt tanks, will be necessary to the accomplishment of regeneration of a considerable number of water softeners. By reason of this fact, there can be a considerable saving in the cost of salt tanks over the necessary cost in instances as now where water softeners include salt tanks as parts of their permanently installed equipment.

It is apparent that when a water softening system and apparatus as herein contemplated is employed to the purpose of causing beds of zeolite to be regenerated, the only water that comes into contact with the zeolite is that of the system in which the zeolite is installed. Stated differently, the "rental" water softener which the invention presents is free from liability that there could be a spreading of contaminated water from the water system of a regenerated softener to a different and remote water system. A salt tank, such as 17, is constructed to be thoroughly cleaned with ease, while a mineral bed of zeolite is not, as will be obvious.

What is claimed is:

1. In a water softening system, the combination with a container having a bed of softening medium, an inlet connection to said container and bed adapted to lead from a source of water supply, and an outlet connection from said container and bed disposed in spaced relation to said inlet connection adapted to lead to locations of use for water, of a vessel for salt, a connector between said inlet connection and said vessel for salt, manually actuable means for selectively controlling flow of water from said inlet connection to said container with bed of softening medium and to said vessel for salt, a valve casing communicating with said outlet connection, a pipe connection adapted to lead from said valve casing to said locations of use for water, a second pipe connection for said valve casing, said second pipe connection constituting a drain outlet for said container with softening medium, a third pipe connection for affording communication between said vessel for salt and said container and softening medium, and means adapted to be actuated to selectively shut off communication between said container with softening medium and said pipe connection and establish communication by way of said outlet connection and valve casing between said container with softening medium and said second pipe connection and to establish communication by way of said outlet connection and valve casing between said container with softening medium and said pipe connection and shut off communication between said container with softening medium and said second pipe connection, said means being adapted to cause communication between said container with softening medium and said pipe connection to be shut off and between the container with softening medium and said second pipe connection to be established for a predetermined interval of time and communication between said container with softening medium and the second pipe connection to be shut off and between said container with softening medium and said pipe connection to be established upon the expiration of said predetermined interval of time, and mechanism for controlling said last mentioned means.

2. In a water softener system, the combination with a container having a bed of softening medium, an inlet connection to said container and bed adapted to lead from a source of water supply, and an outlet connection from said container and bed disposed in spaced relation to said inlet connection adapted to lead to locations of use for water, of a tank for salt, a water conveying pipe adapted to be detachably connected between said inlet connection and said tank for salt, manually actuable means for selectively controlling flow of water from said inlet connection to said container with bed of softening medium and by way of said water conveying pipe to said tank for salt, a valve casing communicating with said outlet connection, a pipe connection adapted to lead from said valve casing to said locations of use for water, a second pipe connection for said valve casing, a brine solution conveying pipe adapted to be detachably connected between said tank for salt and said second pipe connection, a drain outlet from said container with bed of softening medium, and manually actuable means for controlling said drain outlet.

3. The combination as specified in claim 2, and valve means adapted to be actuated to selectively shut off communication between said container with softening medium and said pipe connection and establish communication by way of said outlet connection and valve casing between said container with softening medium and said second pipe connection and to establish communication by way of said outlet connection and valve casing between said container with softening medium and said pipe connection and shut off communication between said container with softening medium and said second pipe connection.

4. The combination as specified in claim 2, and a restriction member in said second pipe connection.

5. In a water softening system, the combination with a container having a bed of softening medium, an inlet connection to said container and bed adapted to lead from a source of water supply, and an outlet connection from said container and bed disposed in spaced relation to said inlet connection adapted to lead to locations of use for water, of a tank for salt, a water conveying pipe adapted to be detachably connected between said inlet connection and said tank for salt, manually actuable means for selectively controlling flow of water from said inlet connection to said container with bed of softening medium and by way of said water conveying pipe to said tank for salt, a valve casing communicating with said outlet connection, a pipe connection adapted to lead from said valve casing to said locations of use for water, a second pipe connection for said valve casing, a brine solution conveying pipe adapted to be detachably connected between said tank for salt and said second pipe connection, a drain outlet from said container with bed of softening medium disposed in spaced relation to said outlet connection, manually actuable means for controlling said drain outlet, and valve means adapted to be actuated to selectively shut off communication between said container with softening medium and said pipe connection and establish communication by way of said outlet connection and valve casing between said container with softening medium and said second pipe connection and to establish communication by way of said outlet connection and valve casing between said container with softening medium and said pipe connection and shut off communication between said container with softening medium and said second pipe connection, said valve means being adapted to cause communication between said container with softening medium and said pipe connection to be shut off and between the container with softening medium and said second pipe connection to be established for a predetermined interval of time and communication between said container with softening medium and the second pipe connection to be shut off and between said container with softening medium and said pipe connection to be established upon the expiration of said predetermined interval of time.

6. In a water softening system, the combination with a container having a bed of softening medium, an inlet connection to said container and bed adapted to lead from a source of water supply, and an outlet connection from said container and bed disposed in spaced relation to said inlet connection adapted to lead to locations of use for water, of a tank for salt, a water conveying pipe adapted to be detachably connected between said inlet connection and said tank for salt, manually actuable means for selectively controlling flow of water from said inlet connection to said container with bed of softening medium and by way of said water conveying pipe to said tank for salt, a valve casing communicating with said outlet connection, a pipe connection adapted to lead from said valve casing to said locations of use for water, a second pipe connection for said valve casing, a brine solution conveying pipe adapted to be detachably connected between said tank for salt and said second pipe connection, a drain outlet from said container with bed of softening medium disposed in spaced relation to said outlet connection, manually actuable means for controlling said drain outlet, valve means adapted to be actuated to selectively shut off communication between said container with softening medium and said pipe connection and establish communication by way of said outlet connection and valve casing between said container with softening medium and said second pipe connection and to establish communication by way of said outlet connection and valve casing between said container with softening medium and said pipe connection and shut off communication between said container with softening medium and said second pipe connection, and means for controlling said valve means to cause communication between said container with softening medium and said pipe connection to be shut off and between the container with softening medium and said second pipe connection to be established for a predetermined interval of time and communication between said container with softening medium and the second pipe connection to be shut off and between said container with softening medium and said pipe connection to be established at the expiration of said predetermined interval of time.

7. The combination as specified in claim 6, wherein said means for controlling said valve means is constituted as a lever, a pivotal support for said lever, a valve stem for said valve means, means connecting a portion of said lever in spaced relation to its pivotal support to said valve stem, a counterweight upon said lever at one side of said pivotal support, and a second counterweight upon said lever at the side of the pivotal support opposite said counterweight, one of said counterweights being constituted as a pail for liquid and having a leak opening.

8. In a water softening system, a container having a bed of softening medium, an inlet connection to said container and bed adapted to lead from a source of water supply, a valve casing, an outlet connection from said container and bed to said valve casing, a pipe connection from said valve casing adapted to lead to a location of use for water, a second pipe connection from said valve casing, valve means adapted selectively to be actuated to control passage of water from said container and bed by way of said valve casing to said pipe connection and said second pipe connection, respectively, and means constituted as a lever, a pivotal support for said lever, a valve stem for said valve means, means connecting a portion of said lever in spaced relation to its pivotal support to said valve means, a counterweight upon said lever at one side of said pivotal support, and a second counterweight upon said lever at the side of the pivotal support opposite said counterweight, one of said counterweights being constituted as a pail for liquid and having a leak opening for controlling said valve means.

9. In a water softening system, a container having a bed of softening medium, an inlet connection to said container and bed adapted to lead from a source of water supply, an outlet connection from said container and bed adapted to lead to locations of use for water, a tank for salt, a pipe for conveying water from said inlet connection to said tank for salt, a drain outlet from said container with bed of softening medium, a pipe for conveying brine solution from said tank for salt to said container with bed of softening medium whence the brine solution can pass to said drain outlet, means adapted to be manually actuated selectively to cause flow of water from said inlet connection by way of said container and bed to said outlet connection to be shut off and flow from the inlet connection by way of said pipes, said tank for salt and said container and bed to said drain outlet to occur, and to cause flow from said inlet connection by way of said pipes, said tank for salt and said container and bed to said drain outlet and by way of said container and bed to said outlet connection to be shut off and from the inlet connection by way of said container and bed to said drain outlet to occur, and mechanism operable a predetermined period of time after flow from said inlet connection by way of said container and bed to said drain outlet has been established for causing flow from the container and bed to the drain outlet to be shut off and capacity for flow from said container and bed to said outlet connection to be established.

10. In a water softening system, a container having a bed of softening medium, an inlet connection to said container and bed adapted to lead from a source of water supply, an outlet connection from said container and bed adapted to lead to locations of use for water, a tank for salt, a pipe for conveying water from said inlet connection to said tank for salt, a drain outlet from said container with bed of softening medium, a pipe for conveying brine solution from said tank for salt to said container with bed of softening medium whence the brine solution can pass to said drain outlet, a drain adapted to lead from said outlet connection, means adapted to be manually actuated selectively to cause flow of water from said inlet connection by way of said container and bed to said outlet connection to be shut off and flow from the inlet connection by way of said pipes, said tank for salt and said container and bed to said drain outlet to occur, and to cause flow from said inlet connection by way of said pipes, said tank for salt and said container and bed to said drain outlet and by way of said container and bed to said outlet connection to be shut off and from the inlet connection by way of said container and bed and said outlet connection to said drain to occur, and mechanism operable a predetermined period of time after flow from said inlet connection by way of said container and bed to said drain has been established for causing flow from the container and bed to the drain to be shut off and capacity for flow from said container and bed to said outlet connection to be established.

11. In a water softening system, a container having a bed of softening medium, an inlet connection to said container and bed adapted to lead from a source of water supply, an outlet connection from said container and bed adapted to lead to locations of use for water, a tank for salt, a pipe for conveying water from said inlet connection to said tank for salt, a drain outlet from said container with bed of softening medium, a pipe for conveying brine solution from said tank for salt to said container with bed of softening medium whence the brine solution can pass to said drain outlet, a drain adapted to lead from said outlet connection, means including a double valve adapted to be manually actuated between spaced valve seats selectively to cause flow of water from said inlet connection by way of said container and bed to said outlet connection to be shut off and from the inlet connection by way of said pipes, said tank for salt and said container and bed to said drain outlet to occur, and to cause flow from said inlet connection by way of said pipes, said tank for salt and said container and bed to said drain outlet and by way of said container and bed to said outlet connection to be shut off and from the inlet connection by way of said container and bed and said outlet connection to said drain to occur, and mechanism operable a predetermined period of time after flow from said inlet connection by way of said container and bed and said outlet connection to said drain has been established for actuating said double valve out of engagement with one of said valve seats into engagement with another of the valve seats to cause flow from the container and bed to the drain to be shut off and capacity for flow from said container and bed to said outlet connection to be established.

12. The combination as specified in claim 10, wherein said mechanism is constituted as a pivotally supported lever and counterweights upon said lever at opposite sides of its pivotal support, including a counterweight constituted as a pail for liquid having a leak opening.

13. The combination as specified in claim 11, wherein said mechanism is constituted as a lever, a pivotal support for said lever, means connecting said lever to said double valve, a counterweight upon said lever at one side of said pivotal support, and a second counterweight upon said lever at the side of said pivotal support opposite said counterweight, one of said counterweights being constituted as a pail for liquid and having a leak opening for controlling said double valve.

14. The combination as specified in claim 11, and a casing housing said double valve and connected with said outlet connection and said pipe for conveying brine solution from said tank for salt to said container with bed of softening medium.

15. In a water softening system, the combination with a container having a bed of softening medium, an inlet connection to said container and bed adapted to lead from a source of water supply, and an outlet connection from said container and bed disposed in spaced relation to said inlet connection adapted to lead to locations of use for water, of a valve casing communicating with said outlet connection, a pipe connection adapted to lead from said valve casing to said locations of use for water, a second pipe connection for said valve casing, valve means adapted to be actuated to selectively shut off communication between said container with softening medium and said pipe connection and establish communication by way of said outlet connection and said valve casing between said container with softening medium and said second pipe connection and to establish communication by way of said outlet connection and said valve casing between said container with softening medium and said pipe connection and shut off communication between said container with softening medium and said second pipe connection, and gravity operated means for controlling said valve means to cause communication between said container with softening medium and said pipe connection to be shut off and between the container with softening medium and said second pipe connection to be established for a predetermined interval of time and communication between said container with softening medium and the second pipe connection to be shut off and between said container with softening medium and said pipe connection to be established at the expiration of said predetermined interval of time, said means for controlling said valve means being constituted as a lever, a pivotal support for said lever, a valve stem for said valve means, means connecting a portion of said lever in spaced relation to its pivotal support to said valve stem, a counterweight upon said lever at one side of said pivotal support, and a second counterweight upon said lever at the side of the pivotal support opposite said counterweight, one of said counterweights being constituted as a pail for liquid and having a leak opening.

THEODORE KAYSEN, JR.